United States Patent [19]

Akabane et al.

[11] Patent Number: 4,736,326

[45] Date of Patent: Apr. 5, 1988

[54] NUMERICAL CONTROL APPARATUS FOR GRINDING MACHINE CAPABLE OF GRINDING TAPER AND NON-TAPER PORTIONS OF WORKPIECE

[75] Inventors: Hitoshi Akabane, Anjoh; Norio Ohta, Okazaki, both of Japan

[73] Assignee: Toyoda Koki Kabushiki Kaisha, Kariya, Japan

[21] Appl. No.: 835,264

[22] Filed: Mar. 3, 1986

[30] Foreign Application Priority Data

Mar. 6, 1985 [JP] Japan ................................ 60-45619

[51] Int. Cl.$^4$ ........................ G05B 19/18; B24B 53/00
[52] U.S. Cl. .............................. 364/474; 51/165.71; 51/165.87
[58] Field of Search ....................... 364/474, 475, 167; 51/165.71, 165.77, 165.87, 289 R

[56] References Cited

U.S. PATENT DOCUMENTS

| | | | |
|---|---|---|---|
| 3,999,332 | 12/1976 | Zakharov | 51/165.87 |
| 4,122,635 | 10/1978 | Asano et al. | 51/165.71 |
| 4,337,599 | 7/1982 | Koide et al. | 364/474 |
| 4,502,125 | 2/1985 | Yoneda et al. | 364/474 |
| 4,521,860 | 6/1985 | Kanematsu et al. | 364/474 |
| 4,555,873 | 12/1985 | Smith | 51/165.87 |
| 4,584,795 | 4/1986 | Akabane | 51/289 R |
| 4,584,796 | 4/1986 | Yoneda et al. | 51/165.71 |
| 4,590,573 | 5/1986 | Hahn | 364/474 |
| 4,603,677 | 8/1986 | Gile et al. | 51/165.71 |

Primary Examiner—Jerry Smith
Assistant Examiner—John R. Lastova
Attorney, Agent, or Firm—Oblon, Fisher, Spivak, McClelland & Maier

[57] ABSTRACT

A numerical control apparatus which controls a grinding machine that includes a work table for supporting a workpiece, a grinding wheel and a truing device for truing the grinding wheel. The workpiece has taper and non-taper portions to be ground. The numerical control apparatus includes first and second storage means for storing first and second truing programs which respectively define first and second relative movements between the truing device and the grinding wheel to form a taper grinding surface and a non-taper grinding surface on the grinding wheel. The numerical control apparatus executes the first truing program prior to grinding the taper portion of the workpiece and also executes the second truing program after grinding the taper portion.

8 Claims, 5 Drawing Sheets

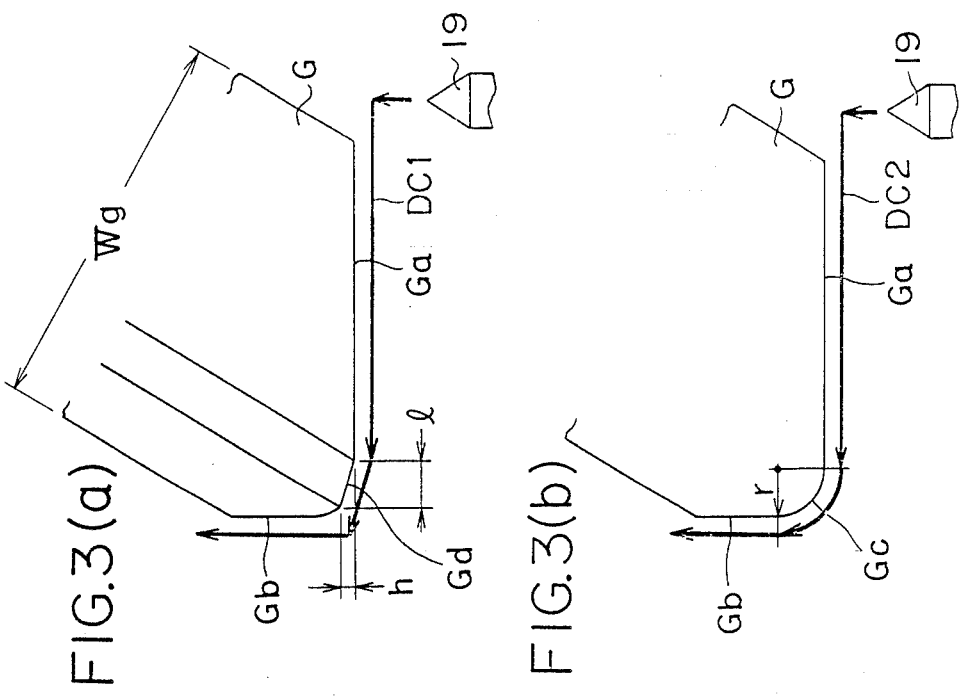
FIG.3(a)
FIG.3(b)
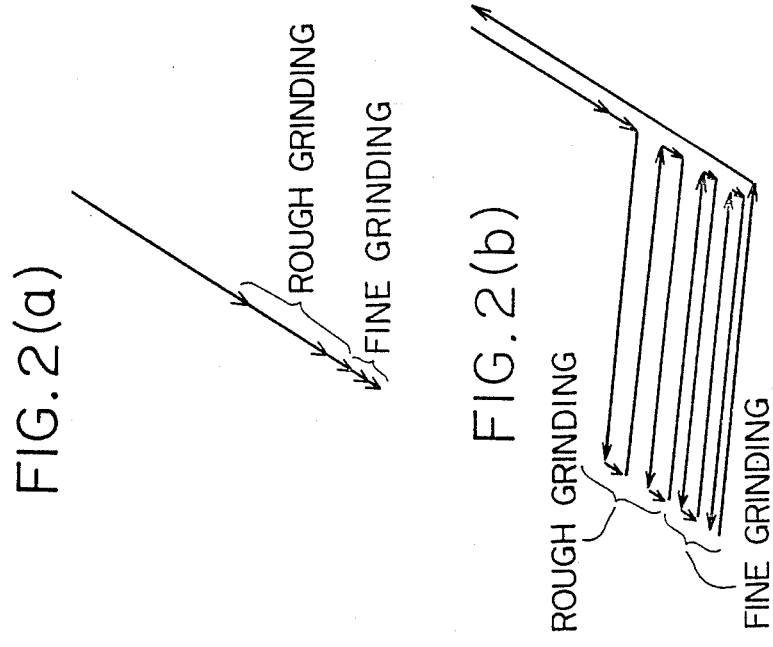
FIG.2(a)
FIG.2(b)

FIG. 4

| C00 | GRINDING MODE | 1 | |
|---|---|---|---|
| C01 | FIRST TRUING CYCLE | 0 | |
| C02 | FIRST TRUING SHAPE | — | |
| C03 | SECOND TRUING CYCLE | 0 | |
| C04 | SECOND TRUING SHAPE | — | |
| C05 | GRINDING PORTION LEFT END POS. | 75000 | NDA1 |
| C06 | GRINDING PORTION RIGHT END POS. | 86000 | |
| C07 | GRINDING PORTION LEFT END DIA. | 62500 | |
| C08 | GRINDING PORTION RIGHT END DIA. | 62500 | |
| ⋮ | ⋮ | ⋮ | |
| C00 | GRINDING MODE | 2 | |
| C01 | FIRST TRUING CYCLE | 1 | |
| C02 | FIRST TRUING SHAPE | 1 | |
| C03 | SECOND TRUING CYCLE | 1 | NDA2 |
| C04 | SECOND TRUING SHAPE | 2 | |
| ⋮ | ⋮ | ⋮ | |

NUMERICAL CONTROL APPARATUS FOR GRINDING MACHINE CAPABLE OF GRINDING TAPER AND NON-TAPER PORTIONS OF WORKPIECE

BACKGROUND OF THE INVENTION

1. Field of the Invention

The present invention relates to a numerical control apparatus for a grinding machine which is capable of grinding a taper portion of a workpiece along with a non-taper portion thereof.

2. Description of the Background

In general, a cylindrical portion of a workpiece is ground by a grinding surface which is formed on a periphery of a grinding wheel in parallel relation with a rotational axis of the workpiece. In order to grind a taper portion of a workpiece with high accuracy and low degree of surface roughness, it is necessary to form a taper grinding surface on the grinding wheel which is parallel with a surface of the taper portion of the workpiece to be ground, or, instead to swivel a work table supporting the workpiece in a horizontal plane so as to make the taper structure of the workpiece parallel with the cylindrical peripheral surface of the grinding wheel.

In a conventional numerical control apparatus for a grinding machine, when grinding a workpiece which has a taper portion and a non-taper portion to be respectively ground, it is impossible to automatically and successively grind the taper portion and the non-taper portion, because such numerical control apparatus does not have the capability of initiating a truing operation for forming a taper grinding surface on the grinding wheel between successive grinding operations on the workpiece.

Therefore, to grind such workpieces in lots, non-taper portions of workpieces are ground first. Then the taper grinding surface is formed on an edge portion of the grinding wheel with a truing tool, or instead, a work table is swiveled so as to make the taper surface of the workpiece parallel with the cylindrical surface of the grinding wheel. After that, taper portions of the workpieces are ground, the non-taper portions thereof having been previously ground.

As a result, in such a conventional numerical control apparatus grinding machine, each workpiece in a lot needs to be unloaded from the machine after the non-taper portion thereof is ground, then the machine is arranged for grinding the taper portion and the workpieces are again loaded one after another in the machine for grinding of the taper portion, resulting in an inefficient time and labor consuming grinding operation.

SUMMARY OF THE INVENTION

It is therefore an object of the present invention to provide an improved numerical control apparatus wherein taper and non-taper portions of a workpiece are efficiently ground with high accuracy and low degree of surface roughness.

Another object of the present invention is to provide an improved numerical control apparatus wherein taper and non-taper portions of the workpiece are accurately ground in succession without any manual intervention.

Briefly, according to the present invention, these and other objects are achieved by providing a numerical control apparatus for controlling a grinding machine which includes a work table for supporting a workpiece having taper and non-taper portions to be ground by a grinding wheel, and a truing device for truing the grinding wheel to form a desired grinding surface thereon. The numerical control apparatus includes first and second storage means for storing first and second truing programs which respectively define first and second relative movements between the truing device and the grinding wheel to form a taper grinding surface and a non-taper grinding surface on the grinding wheel. The first truing program is executed prior to grinding the taper portion of the workpiece, and the second truing program is executed after grinding the taper portion of the workpiece.

BRIEF DESCRIPTION OF THE DRAWINGS

A more complete appreciation of this invention and many of the attendant advantages thereof will be readily obtained as the same becomes better understood by reference to the following detailed description when considered in connection with the accompanying drawings, wherein:

FIGS. 2(a) and 2(b) are schematic sketches exemplifying two grinding cycles;

FIGS. 3(a) and 3(b) are schematic sketches showing two grinding wheel truing cycles;

FIG. 4 is an explanatory view illustrating the configuration of a memory 22 shown in FIG. 1;

DESCRIPTION OF THE PREFERRED EMBODIMENT

Figure 1:
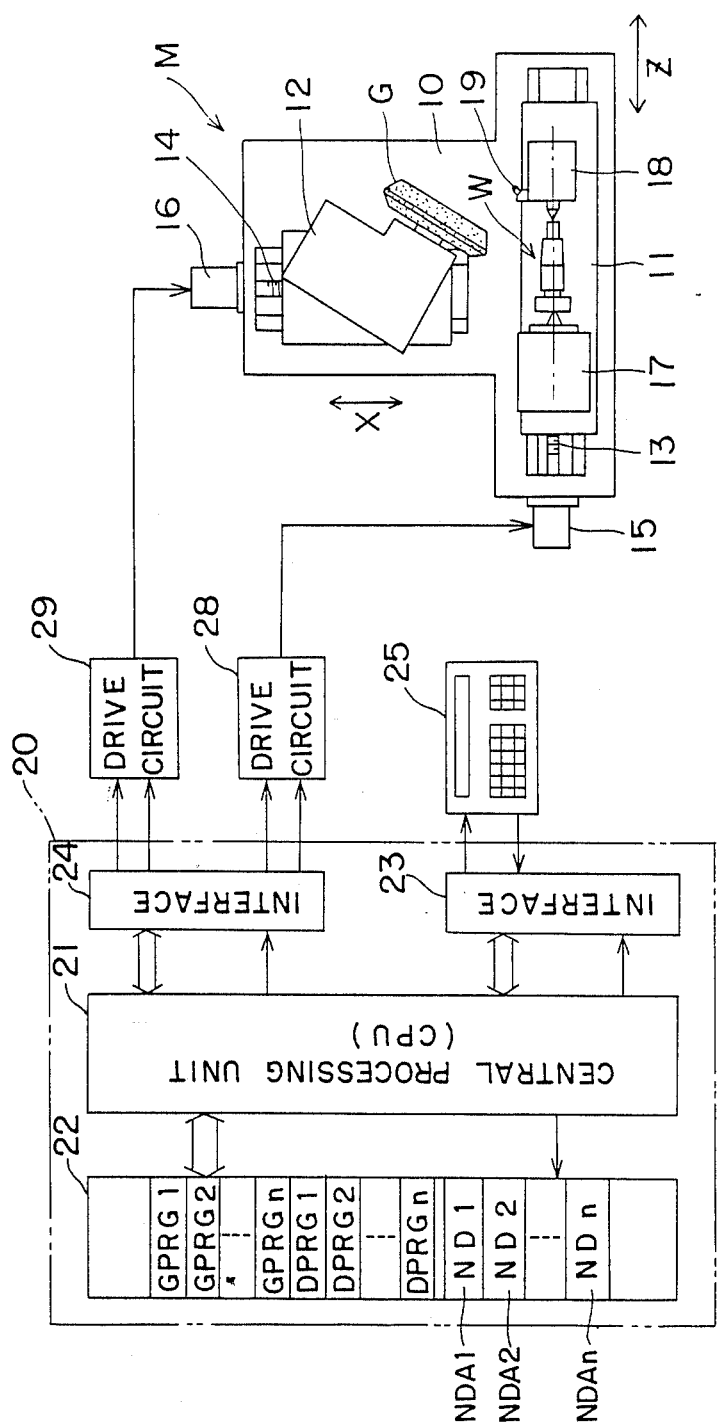
FIG. 1 is a block diagram of a numerical control apparatus according to the present invention, and includes a schematic plan view of a cylindrical grinding machine controlled thereby.

Referring now to the drawings, wherein like reference numerals designate identical or corresponding parts throughout the several views, and more particularly to FIG. 1 in particular, a grinding machine M is illustrated having a bed 10, on which are mounted a work table 11 and a wheel head 12 so as to be slidable along respective axes Z, X perpendicular with each other. Respective servomotors 15, 16 are drivingly connected with work table 11 and wheel head 12 by way of feed screws 13, 14 and nuts (not shown). A work head 17 and a foot stock 18 which rotatably support a workpiece W therebetween are mounted on work table 11. A grinding wheel G is rotatably mounted on wheel head 12.

A truing device 30 has a truing tool 19 which is fixed to foot stock 18. Therefore, truing tool 19 is capable of truing the grinding wheel G so as to form a desired grinding surface on a periphery thereof, when work table 11 and wheel head 12 are relatively moved by numerically controlled servomotors 15, 16.

A computerized numerical controller 20 is composed of a central processing unit (hereafter referred to as "CPU)" 21, a memory 22, and interfaces 23, 24. A key board 25 for inputting data is connected to interface 23, and servomotor drive units 28, 29 are coupled to interface 24.

In memory 22 there is allocated a system program which is executed by CPU 21 so as to control operations of grinding machine M by, for instance, controlling distribution of pulses to servomotor drive units 28, 29. In addition, numerical control programs GPRG1-GPRGn for respectively performing grinding cycles such as shown in FIGS. 2(a), 2(b) and truing programs DPRG1-DPRGn for performing truing cycles such as shown in FIGS. 3(a), 3(b) are stored in memory 22.

Figure 6A:
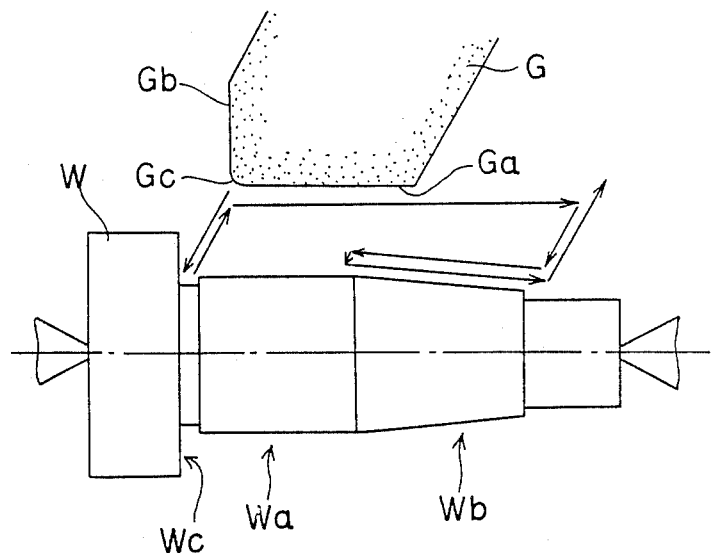
FIGS. 6(a) and 6(b) are explanatory views illustrating operational steps in grinding a workpiece according to the present invention.
Figure 6B:
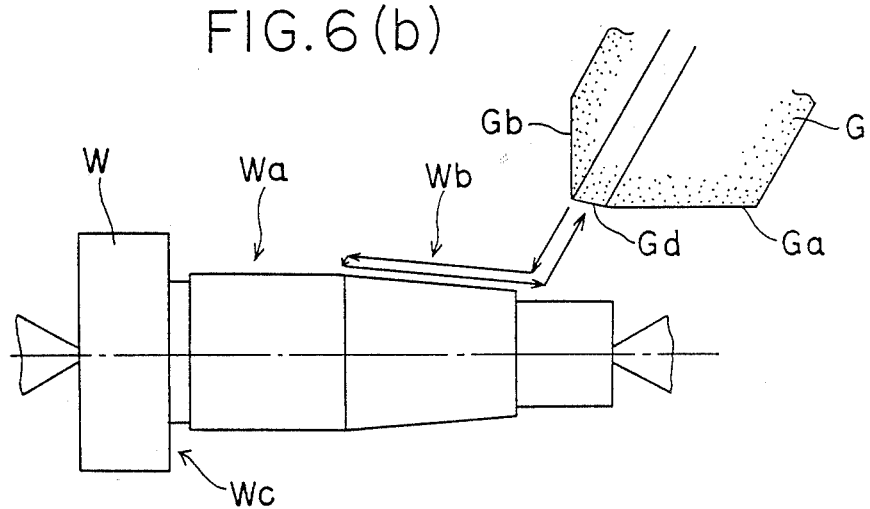

FIG. 2(a) shows a plunge-cut grinding cycle wherein grinding wheel G is moved by simultaneous distribution of pulses to drive units 28, 29 along a path extending at an acute angle to axis Z, so as to perform a rough grinding operation and a successive finish grinding operation on a cylindrical portion Wa as well as a shoulder portion Wc of workpiece IV as shown in FIG. 6(a). FIG. 2(b) shows a taper grinding cycle wherein grinding wheel G is reciprocated relative to workpiece W along an inclined traverse path so as to grind a taper portion Wb of workpiece W as shown in FIGS. 6(a), 6(b). A feed amount of grinding wheel G toward workpiece W at a traverse end of each inclined traverse path in a rough grinding operation of the taper grinding cycle is larger than in a finish grinding operation.

FIG. 3(a) shows, as an example, one type of first truing cycle DC1 for forming a first grinding surface which has a cylindrical grinding surface Ga, a shoulder grinding surface Gb, and a taper grinding surface Gd that is formed on an edge portion located between both surfaces Ga, Gb. FIG. 3(b) shows one type of second truing cycle DC2 for forming a second grinding surface on a periphery of grinding wheel G which has a cylindrical grinding surface Ga parallel with a rotational axis of workpiece W, a shoulder grinding surface Gb perpendicular to cylindrical grinding surface Ga, and an arc grinding surface Gc located between cylindrical grinding surface Ga and shoulder grinding surface Gb. Now, a first truing cycle is defined as a truing cycle which is supposed to be performed prior to a finish grinding operation, and a second truing cycle is defined as a truing cycle which is supposed to be performed after the finish grinding operation.

Memory 22 includes numeral data storage areas NDA1-NDAn, as shown in FIG. 4, wherein there are stored numeral data ND1-NDm corresponding to dimensions which plural portions of workpiece W are supposed to be ground with, and are utilized in grinding operation. Data on feed amounts and feed rates, traverse amounts and so forth in respective grinding cycles are input into respective numeral data storage areas NDA1-NDAn by means of key board 25. In addition, in respective numeral data storage areas NDA1-NDAn there are stored data including a datum which designates a type of grinding cycle, a datum which shows whether a first truing cycle needs to be performed or not, a datum which designates a type of first truing cycle, a datum which shows whether a second truing cycle needs to be performed or not, and a datum which designates a type of second truing cycle.

That is, a code C00 represents a choice among grinding cycles so that a datum in a space corresponding to code C00 shows a type of grinding cycle to be performed. Codes C01, C03 respectively represent performance of first and second truing cycles. Therefore respective data "0" and "1" in spaces corresponding to codes C01, C03 denote the nonnecessity and necessity of performance of the first and second truing cycles. Codes C02, C04 respectively represent a choice between first and second truing cycles so that data in spaces corresponding to code C02, C04 show respective types of first and second truing cycle to be performed. Further codes C05–C08 represent dimensions of a workpiece so that data in spaces corresponding codes C05–C08 show dimensions of characteristic portions of a finished workpiece W.

Further, data on dimensions of the grinding surfaces of grinding wheel G, feed rates and so forth which are required in performing first and second cycles are input into other data areas of memory 22 by means of key board 25. For instance, data which define the relative movement between truing device 30 and wheel head 12 so as to form a taper grinding surface Gd in the first truing cycle PC1 shown in FIG. 3(b) are set such that an inclination of a taper grinding surface Gd is the same as that of the traverse path of grinding wheel G relative to workpiece W in the taper grinding cycle shown in FIG. 2(b).

Now, a case as shown in FIGS. 6(a), 6(b) is considered where grinding wheel G is trued by truing tool 19 in the second truing cycle DC2 after a previous finish grinding operation in the taper grinding cycle. Then grinding wheel G is angularly moved toward workpiece W so as to perform the rough grinding operation and the successive finish grinding operation on cylindrical portion Wa and shoulder portion Wc, in the plunge-cut grinding cycle. Then grinding wheel G is moved along the inclined traverse path so as to perform the rough grinding operation on taper portion Wb. Thereafter grinding wheel G is trued by truing tool 19 in the first truing cycle DC1 so as to form taper grinding surface Gd on the edge portion of grinding wheel G. Finally, the finish grinding operation on taper portion Wb is performed by taper grinding surface Gd.

Numeral data are input in data storage areas ND1, ND2 as shown in FIG. 4. Namely, datum "1" which designates the grinding cycle shown in FIG. 2(a) is written in a space corresponding to code C00, and data "0" and "0" are written in respective spaces corresponding to codes C01, C03 in data storage area NDA1 where data for grinding cylindrical and shoulder portions Wa, Wc are stored. Further in data storage area NDA2 where data for grinding taper portion Wb are stored, a datum "2" which designates the grinding cycle shown in FIG. 2(b) is written in a space corresponding to code C00, and data "1" and "1" are written in respective spaces corresponding to codes C01, C03. The datum "1" in the space corresponding to code C01 denotes that the first truing cycle is to be performed prior to the finish grinding operation in the taper grinding cycle. A datum "1" which is written in a space corresponding to code C02 denotes that the first truing cycle DC1 is to be performed. The datum "1" in the space corresponding to code C03 denotes that the second truing cycle is to be performed after the finish grinding operation of the taper grinding cycle or prior to the rough grinding operation in the plunge-cut grinding cycle on a next workpiece $\overline{W}$. A datum "2" written in a space corresponding to code C04 denotes that the second truing cycle DC2 is to be performed.

Figure 5:
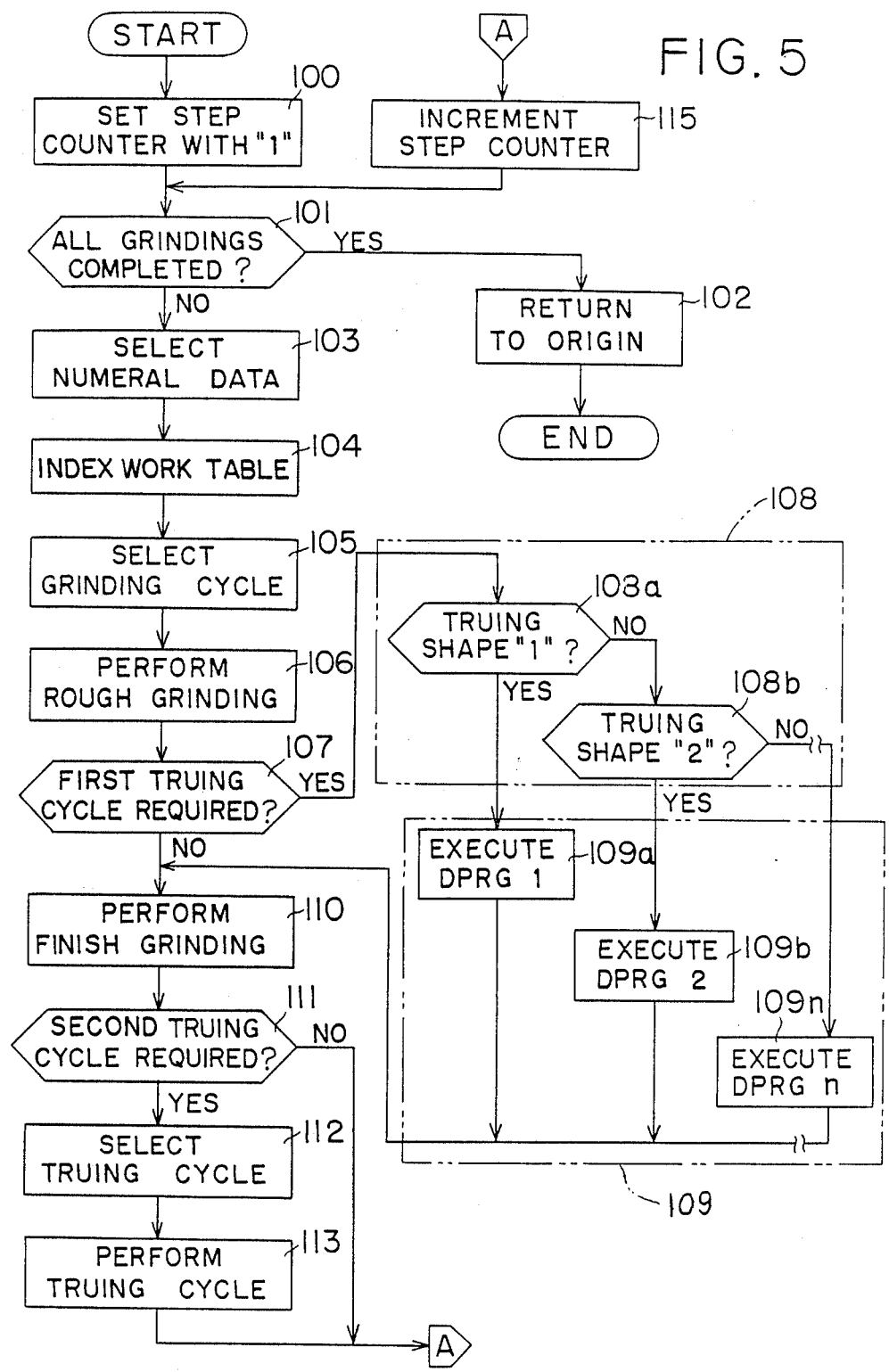
FIG. 5 is a flow chart of a system program executed by a central processing unit 21 shown in FIG. 1 in controlling a grinding operation of the grinding machine.

The operation of computerized numerical controller 20 will now be explained. When an automatic operation is initiated, CPU 21 of numeral controller 20 executes processes shown in FIG. 5. At the beginning, a step counter is set to indicate "1" (step 100). The step counter is allocated in memory 22 so that a content thereof indicates an order number of a grinding cycle to be performed from that point. Then, the number "1" registered in the step counter is searched among the order numbers of numeral data storage areas NDA1-NDAn so as to examine the existance of a grinding cycle to be performed (101). Numeral datum ND1 stored in numeral data storage area NDA1 is selected in accordance with the number "1" registered in the step counter (step 103) so as to execute the later processes using numeral data ND1. At step (104), work table 11 is longitudinally indexed in accordance with a reference dimension of the workpiece W stored in numeral data storage area NDA1. Then, numerical control program GPRG1 for performing the plunge-cut grinding cycle is selected from among many programs GPRG1-GPRGn because the datum "1" is written in the space corresponding to code C00 (step 105). At step 106, the rough grinding operation in the plunge-cut grinding cycle is performed on cylindrical and shoulder portions Wa, Wc of workpiece W. Thereafter, it is ascertained whether or not performance of the first truing cycle is required (step 107). In this case, as the datum "0" is written in the space corresponding to code C01, the first truing cycle is not performed. Then, the finish grinding operation in the plunge-cut grinding cycle is successively performed (step 110). The second truing cycle also is not required to be performed as the datum "0" is written in the space corresponding to code C03. Thereafter, the step counter is incremented (step 115) so as to perform the next grinding cycle.

Now, numeral data ND2 stored in numeral data storage area NDA2 is selected according to the number "2" registered in the step counter (step 101). Work table 11 is longitudinally indexed in accordance with numeral data ND2. Then, numerical control program GPRG2 for performing the taper grinding cycle is selected as the datum "2" is written in the space corresponding to code C00 (step 105). The rough grinding operation in the taper grinding cycle is performed on taper portion Wb (step 106). Thereafter, it is ascertained whether or not performance of the first truing cycle is required (107). As the datum "1" is stored in the space corresponding to C01 in numeral data storage area NDA2, the first truing cycle is required to be performed. Truing program DPRG1 for performing first truing cycle DC1 shown in FIG. 3(a) is selected from among plural programs DPRG1-DPRGn as the datum "1" is written in the space corresponding to code C02 (step 108a). Then, truing program DPRG1 is executed so as to form the first grinding surface on the periphery of grinding wheel G (step 109a). In the present embodiment, a width Wg of grinding wheel G is 75 mm, a longitudinal length (l) and a transverse length (h) of taper grinding surface Gd are respectively 3 mm and 0.125 mm. As a radius (r) of arc grinding surface Gc on the second grinding surface shown in FIG. 3(b) is 1 mm, the periphery of grinding wheel can be change from the second grinding surface to the first grinding surface by single truing travel of truing tool 19 on grinding wheel G, and can be changed vice versa by two truing travels.

Thereafter, the finish grinding operation in the taper grinding cycle is performed on taper portion Wb by taper grinding surface Gd with high accuracy and low degree of surface roughness. Then, it is ascertained whether or not the second truing cycle is required to be performed (step 111). The datum "1" stored in the space corresponding to code C03 shows that performance of the second truing cycle is required. Truing program DPRG2 for performing second truing cycle DC2 is selected from among programs DPRG1-DPRGn as the datum "2" is stored in the space corresponding to code C04 (step 112). Truing program DPRG2 is executed so as to form the second grinding surface (step 113). As a result, the second grinding surface having cylindrical grinding surface Ga, shoulder grinding surface Gb and arc grinding surface Gc are formed on the periphery of grinding wheel G after the finish grinding operation in the taper grinding cycle. The step counter is incremented (step 115), and it is ascertained whether or not a grinding cycle which is given an order number equal to the number in the step counter exists. Nonexistance of such grinding cycle means completion of the grinding operation on workpiece W. Then work table 11 and wheel head 12 are returned to their respective origin (step 102).

Although in the above-described embodiments, wheel head 12 is moved along a path extending at a right angle to the axis of rotation of workpiece W, the same effect as in the above-described embodiments can be obtained in the case where wheel head 12 is moved along a path extending at an acute angle to the rotational axis of workpiece W.

Moreover, the first truing program for forming the taper grinding surface Gd on a grinding wheel G might be executed prior to the rough grinding operation on the taper portion of workpiece W.

Further, should it be required, truing tool 19 might be attached to a slide which is movably mounted on wheel head 12 along respective axes perpendicular with each other.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A numerical control apparatus for controlling a grinding machine which has a wheel head for rotatably supporting a grinding wheel, a work table for rotatably supporting a workpiece having taper and non-taper portions to be ground, said wheel head and said work table being relatively movable to grind said workpiece with said grinding wheel, and a truing device which is movable relative to said wheel head for truing said grinding wheel so as to form a desired grinding surface on a periphery thereof, said numerical control apparatus comprising:
 first storage means for storing a first truing program which defines a relative movement between said truing device and said wheel head to form a taper grinding surface on a portion of said grinding wheel which is parallel with a surface of said taper portion of said workpiece;
 second storage means for storing a second truing program which defines a relative movement between said truing device and said wheel head to form a non-taper grinding surface on said periphery of said grinding wheel;
 third storage means for storing a taper grinding program which defines a relative movement of said wheel head parallel with an ideal final shape of said taper portion so as to execute a rough grinding and finished grinding on said taper portion of said workpiece;
 fourth storage means for storing a non-taper grinding program which defines a relative movement of said wheel head so as to grind said non-taper portion of said workpiece;
 grinding control means for executing said non-taper grinding program to grind said non-taper portion prior to said taper portion, and then executing said taper grinding program to grind said taper portion of said workpiece;
 truing control means for prohibiting execution of said first or second truing programs after grinding of said non-taper portion, and for executing said first truing program after said rough grinding on said taper portion and executing said second truing program after said finish grinding on said taper portion of said workpiece.

2. A numerical control apparatus as set forth in claim 1, wherein said truing control means comprises:
 a data storage area for defining whether or not said truing programs are to be executed in relation to execution of said non-taper and taper grinding programs, said data storage area storing information defining prohibition of execution of said truing programs after grinding operation on said non-taper portion and execution of said first and second truing programs after said rough and finish grindings, respectively, on said taper portion;
 data input means for inputting said information into said storage area; and
 execution means for executing said first and second truing programs according to said information stored in said data storage area.

3. A numerical control apparatus as set forth in claim 2, wherein said first truing program defines a relative movement to form said taper grinding surface on an edge portion of said grinding wheel.

4. A numerical control apparatus as set forth in claim 3, wherein said second truing program defines a relative movement to form a cylindrical grinding surface on the periphery of said grinding wheel and an arc grinding surface on said edge portion of said grinding wheel.

5. A numerical control apparatus for controlling a grinding machine which has a wheel head for rotatably supporting a grinding wheel, a work table for rotatably supporting a workpiece having taper and non-taper portions to be ground, first and second feed means for relatively moving said wheel head and said work table along first and second axes, and a truing device mounted on said work table for truing said grinding wheel to form a desired grinding surface on a periphery thereof, said numerical control apparatus comprising:
 first storage means for storing a first truing program which defines a relative movement between said wheel head and work table to form a taper grinding surface parallel with a surface of said taper portion of said workpiece on a portion of said grinding wheel by means of said truing device;
 second storage means for storing a second truing program which defines a relative movement between said wheel head and work table to form a non-taper grinding surface on said periphery of said grinding wheel by means of said truing device;
 third storage means for storing a taper grinding program which defines a relative movement of said wheel head parallel with an ideal final shape of said taper portion so as to execute a rough grinding and finish grinding on said taper portion of said workpiece;
 fourth storage means for storing a non-taper grinding program which defines a relative movement of said wheel head so as to grind said non-taper portion of said workpiece;
 grinding control means for executing said non-taper grinding program to grind said non-taper portion prior to said taper portion, and then executing said taper grinding program to grind said taper portion of said workpiece;
 truing control means for prohibiting to execute said first or second truing programs after grinding operation on said non-taper portion, and for executing said first truing program after said rough grinding on said taper portion and executing said second truing program after said finish grinding on said taper portion of said workpiece.

6. A numerical control apparatus as set forth in claim 5, wherein said truing control means comprises:
 a data storage area for defining whether or not said truing programs are to be executed in relation to execution of said non-taper and taper grinding programs, said data storage area storing information defining prohibition of execution of said truing programs after grinding operation on said non-taper portion and execution of said first and second truing programs after said rough and finish grindings, respectively, on said taper portion;

data input means for inputting said information into said storage area; and execution means for executing said first and second truing programs according to said information stored said data storage area.

7. A numerical control apparatus as set forth in claim 6, wherein said first truing program defines a relative movement to form said taper grinding surface on an edge portion of said grinding wheel.

8. A numerical control apparatus as set forth in claim 7, wherein said second truing program defines a relative movement to form a cylindrical grinding surface on the periphery of said grinding wheel and an arc grinding surface on said edge portion of said grinding wheel.

* * * * *